(12) United States Patent
Nam

(10) Patent No.: US 8,760,405 B2
(45) Date of Patent: Jun. 24, 2014

(54) COVER FOR PORTABLE TERMINAL

(75) Inventor: Myoung-Ji Nam, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 762 days.

(21) Appl. No.: 12/623,511

(22) Filed: Nov. 23, 2009

(65) Prior Publication Data

US 2010/0177036 A1    Jul. 15, 2010

(30) Foreign Application Priority Data

Jan. 12, 2009  (KR) .................. 10-2009-0002212

(51) Int. Cl.
*G06F 3/02* (2006.01)
(52) U.S. Cl.
USPC .......................................... 345/169; 345/168
(58) Field of Classification Search
None
See application file for complete search history.

(56) References Cited

U.S. PATENT DOCUMENTS

| | | | |
|---|---|---|---|
| 6,535,199 B1 * | 3/2003 | Canova et al. | 345/168 |
| 7,289,083 B1 * | 10/2007 | Canova, Jr. | 345/1.1 |
| 2003/0103041 A1 * | 6/2003 | Nguyen et al. | 345/168 |
| 2008/0074400 A1 * | 3/2008 | Gettemy et al. | 345/173 |
| 2010/0045628 A1 * | 2/2010 | Gettemy et al. | 345/173 |

* cited by examiner

*Primary Examiner* — Adam R Giesy
(74) *Attorney, Agent, or Firm* — Cha + Reiter, LLC

(57) ABSTRACT

A cover for a portable terminal having a fixing part for fixing the portable terminal and a folder rotating at the fixing part to open and close the portable terminal. The cover includes an input unit and/or a display unit, and a charging unit. The input unit inputs data to the portable terminal. The display unit displays data from the portable terminal. The input unit and display unit are constructed in the folder. The charging unit is constructed in at least one of the fixing part and folder, and supplies power to the portable terminal generated using a solar cell.

21 Claims, 4 Drawing Sheets

COVER FOR PORTABLE TERMINAL

CLAIM OF PRIORITY

This application claims the benefit of priority under 35 U.S.C. §119, from patent application Serial No. 10-2009-0002212 filed in the Korean Intellectual Property Office on Jan. 12, 2009, the contents of which are incorporated by reference.

BACKGROUND OF THE INVENTION

1. Field of the Invention

The present invention relates to a cover attachable to a portable terminal to protect the portable terminal from the external environment. More particularly, the present invention relates to a cover for a portable terminal and improvements user accessibility of portable terminals.

2. Description of the Related Art

In response to technological advances of the electronic communication industry, portable terminals are being designed with an increasing diverse functionality, yet at the same time are their overall construction is lighter in weight, slimmer, and more miniaturized than ever before. For example, in such devices a speaker being capable of realizing a variety of melodies, and/or a color display unit with millions of pixels is arranged in some of the new portable terminals. Also, the portable terminal provides music listening function through a Motion Picture Expert Group Layer-3 (MP3) player (MP3P) in addition to a phone call function. Further, the portable terminals provide functionality for receiving radio, Digital Multimedia Broadcasting (DMB), etc. as well as a variety of game contents through the color display unit.

Furthermore, portable terminals may include various kinds of accessories to make their appearance elegant. In addition, there is a cover attachable to the portable terminal for protecting the portable terminal from an external shock, etc. The cover is typically hinged or slidably attached to the portable terminal and is opened and closed at a constant angle, thereby being capable of opening and closing the display of the portable terminal depending on use or non-use. The cover is an accessory functioning to simply make the portable terminal elegant and protect the portable terminal from the external, but does not satisfy the increasing preference of being lighter and slimmer. Thus, there is a need in the art for an improved cover not known heretofore.

SUMMARY OF THE INVENTION

The present invention provides a cover for a portable terminal, that in addition to be attachable to the portable terminal, also comprises of a unit capable of performing at least one function related to the portable terminal.

According to an exemplary aspect of the present invention, a cover for a portable terminal is attachable to the portable terminal and comprised of a unit capable of displaying data provided from the portable terminal and additionally permits inputting of a signal for controlling the portable terminal.

Another exemplary aspect of the present invention is to provide a cover for a portable terminal attachable to the portable terminal and additionally comprised of a unit capable of supplying power required to operate the portable terminal.

The above aspects are achieved by providing a cover for a portable terminal according to the present invention as disclosed herein.

In accordance with an exemplary aspect of the present invention, a cover for a portable terminal includes a fixing part for fixing the portable terminal and a folder rotating at the fixing part to open and close the portable terminal is provided. The cover preferably includes an input unit or/and a display unit, and a charging unit. The input unit inputs data to the portable terminal. The display unit displays data from the portable terminal. The input unit and display unit are constructed in the folder. The charging unit is constructed in at least one of the fixing part and folder, and supplies power generated using a solar cell to the portable terminal.

In accordance with another exemplary aspect of the present invention, a detachable cover for a portable terminal includes an input unit for inputting data to the portable terminal or/and a display unit for displaying data from the portable terminal or/and a charging unit for supplying power generated using a solar cell to the portable terminal.

Other exemplary aspects, advantages and salient features of the invention will become more apparent to those skilled in the art from the following detailed description, which, taken in conjunction with the annexed drawings, discloses exemplary embodiments of the invention in more detail.

BRIEF DESCRIPTION OF THE DRAWINGS

The above and other exemplary objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of exemplary embodiments of the present invention as defined by the claims. The description includes various specific details to assist in that understanding, but these details are to be regarded as merely exemplary. Accordingly, those of ordinary skill in the art will recognize that various changes and modifications of the exemplary embodiments described herein can be made without departing from the scope and spirit of the invention as defined by the appended claims. Also, descriptions of well-known functions and constructions may be omitted for conciseness and so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention as understood by a person of ordinary skill in the art. Accordingly, it should be apparent to those skilled in the art that the following description of exemplary embodiments of the present invention are provided for illustration purpose only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Preferred exemplary embodiments of the present invention will be described below with reference to the accompanying drawings.

The present invention provides a cover for providing a protective covering with an improved appearance of a portable terminal. More particularly, the present invention provides a cover for a portable terminal being capable of performing a multiple function such as data output or/and input or/and power supply, etc.

Figure 1:
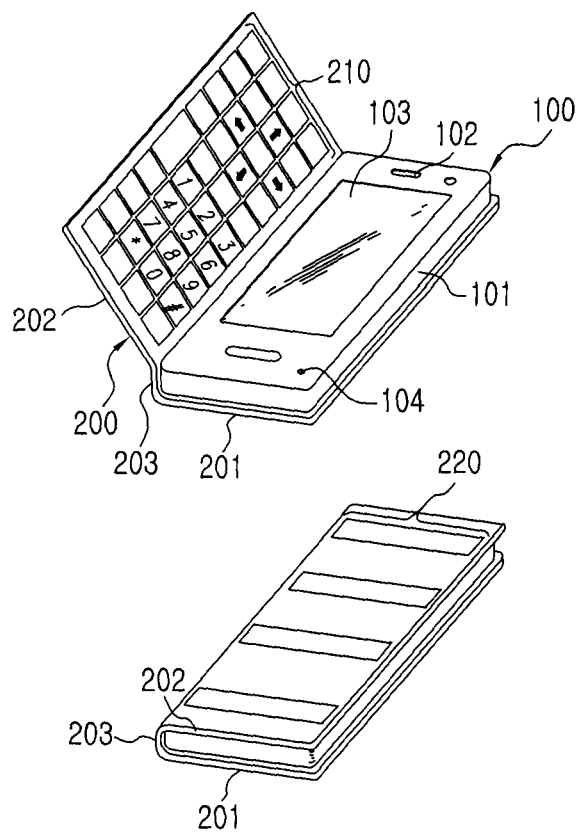
FIG. 1 is a perspective diagram illustrating a state in which a cover is mounted on a portable terminal according to an exemplary embodiment of the present invention.

FIG. 1 is a perspective diagram and a construction section illustrating a state in which a cover is mounted on a portable terminal according to an exemplary embodiment of the present invention.

Referring now to FIG. 1, the portable terminal 100 in this example is mounted and fixed to the cover 200. The portable terminal 100 includes a case frame 101 that defines outer surface, and has elements installed in an inner space of the case frame 101. The portable terminal 100 includes a speaker 102 for outputting a voice signal, and a display 103 for outputting a video signal. Further, the portable terminal 100 includes a microphone 104 for inputting an audio signal, typically voice signal. The display 103 may comprise, for example, a Liquid Crystal Display (LCD) with millions of pixels, but any type of thin film type of display screen can be used. Also, the portable terminal 100 may comprise a general keypad assembly as a data input means. In a case where a touch screen function is provided the LCD, the display 103 may function as the data input unit in place of the keypad assembly or as auxiliary unit. The following description is based on the assumption that the portable terminal 100 provides the display (or, referred to as "main input unit") 103 for enabling touch input as a main data input means. Although these features are shown in FIG. 1, there may be other types of devices in which the display is not disposed near the keyboard. Thus the description of the features and their relative locations in the drawings does not in any way limit the claimed invention to the embodiments shown and described herein.

The cover 200 includes a mounting part 201 for mounting and fixing the portable terminal 100, a folder 202 being rotatable to permit access to and protect the display in which the folder in a first position opens access to the display and in another position closes/covers access to the display 103 of the portable terminal 100. A connection part 203 provides for connecting the mounting part 201 with the folder 202. It doesn't matter whether the connection part 203 is included in the mounting part 201 or the folder 202.

The folder 202 includes an input unit (hereinafter, referred to as "sub-input unit") 210 that is coupled to the portable terminal for providing an input signal to the portable terminal 100 or/and a sub display unit for displaying data output from the portable terminal 100. The sub input unit 210 can be of an input scheme using a dome switch, an input scheme using a pressure sensor, a touch input scheme, etc. Also, the sub-display unit may comprise, for example, a flexible display. Particularly, according to an exemplary embodiment of the present invention, the sub-display unit uses Electronic ink (E-ink), and the sub-input unit 210 operates a touch input scheme using the E-ink. The following description assumes that the sub-input unit 210 using the touch input scheme includes the E-ink sub display unit according to an exemplary embodiment of the present invention.

The sub-input unit 210 is constructed on the folder 202 to be electrically coupled with the main input unit 103, and may be selectively used for input. That is, the portable terminal 100 may apply the sub-input unit 210 as an auxiliary data input unit of the main input unit 103.

A charging unit 220 using a solar cell for charging is included in at least one of the mounting part 201, the folder 202, and the connection part 203 and thus, may supply power required to operate the portable terminal 100 and the sub-input unit 210. According to an exemplary embodiment of the present invention, the charging unit 220 is constructed in both the mounting part 201 and the folder 202. Particularly, the charging unit 220 constructed in the folder 202 is stacked and constructed on an upper part of the sub-input unit 210.

The cover 200 in this exemplary embodiment includes a connector for electrically connecting the sub-input unit 210 and charging unit 220 with the portable terminal 100, in either the mounting part 201 or the connection part 203. The portable terminal 100 may sense that it electrically connects with the cover 200 through the connector and perform a corresponding function.

Thus, a user unfolds the folder 202 and selectively operates the sub-input unit 210, thereby being able to control the portable terminal 100. Also, the charging unit 220 provided in the mounting part 201 and the folder 202 may supply power required to operate the sub-input unit 210 or the portable terminal 100. For example, the charging unit 220 may charge a battery of the portable terminal 100.

Figure 2:
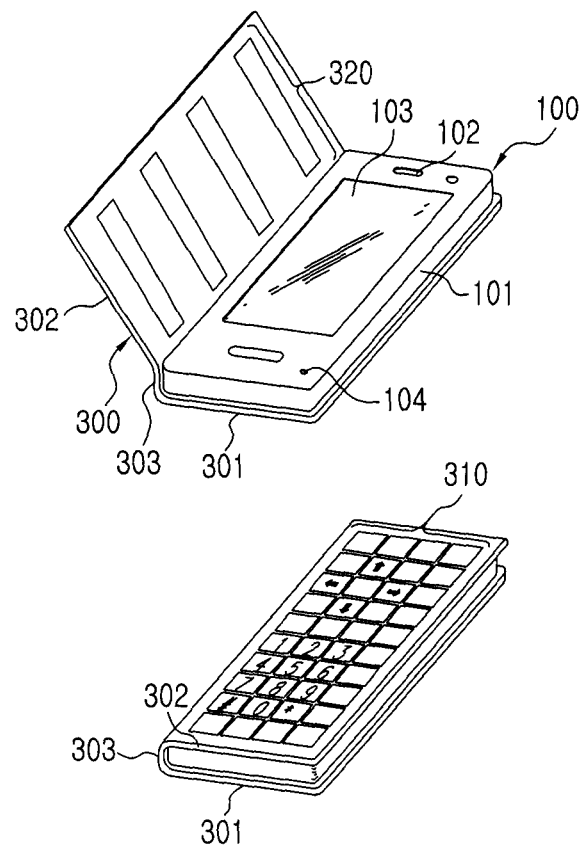
FIG. 2 is a perspective diagram illustrating a state in which a cover is mounted on a portable terminal according to another exemplary embodiment of the present invention.

FIG. 2 is a perspective diagram and a construction section illustrating a state in which a cover is mounted on a portable terminal according to another exemplary embodiment of the present invention.

Referring now to FIG. 2, the cover 300 includes a mounting part 301 for mounting and fixing the portable terminal 100, a folder 302 rotatable to open and close the display 103 of the portable terminal 100, and a connection part 303 for connecting the mounting part 301 with the folder 302.

The cover 300 preferably includes a sub-input unit 310 and charging unit 320 having many of the same functions as those of FIG. 1. Compared to the cover 200 of FIG. 1, the cover 300 of FIG. 2 is an example wherein the stacking sequence of the sub input-unit 310 and charging unit 320 constructed in the folder 302 is reversed. If the folder 302 is folded, the portable terminal 100 may be controlled by the sub input-unit 310 in the external. Also, the portable terminal 100 may be supplied with power required for operation by unfolding the folder 302 and providing the solar cells to access light needed to provide power.

Figure 3:
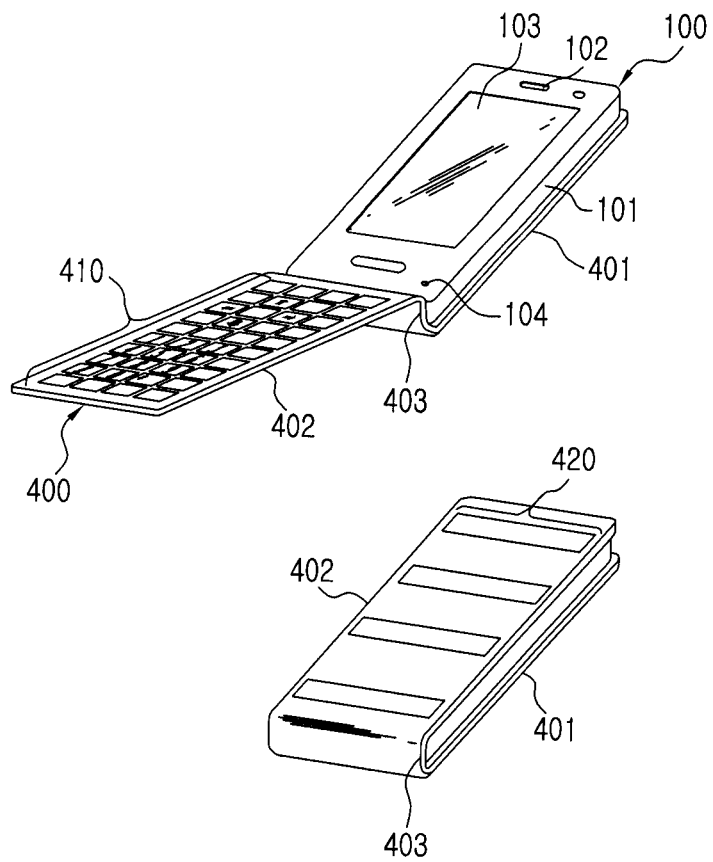
FIG. 3 is a perspective diagram illustrating a state in which a cover is mounted on a portable terminal according to a further exemplary embodiment of the present invention.

FIG. 3 is a perspective diagram illustrating a state in which a cover is mounted on a portable terminal according to a further exemplary embodiment of the present invention.

Referring now to FIG. 3, the cover 400 preferably includes a mounting part 401 for mounting and fixing the portable terminal 100, a folder 402 rotatable to open and close the display 103 of the portable terminal 100, and a connection part 403 for connecting the mounting part 401 with the folder 402.

Figure 4:
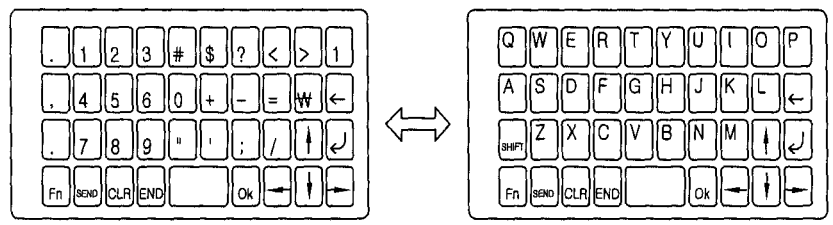
FIGS. 4A to 4D are diagrams illustrating some examples of keypads adapted to sub-input units according to an exemplary embodiment of the present invention.

Unlike the folders 202 and 302 of FIGS. 1 and 2, the folder 402 opens and closes the display 103 in the longitudinal direction of the portable terminal 100, so the folder flips open. As illustrated in FIG. 3, the folder 402 constructs a sub-input unit 410 of the same function as those of in FIGS. 1 and 2 to be in contact with the main input unit 103. Also, the folder 402 stacks a charging unit 420 of the same function as those of FIGS. 1 and 2 on an upper part of the sub-input unit 410. However, the example shown in FIG. 4 does not intend to limit the scope of the present invention, and the folder 402 may also invert the stacking sequence of the sub-input unit 410 and the charging unit 420.

FIGS. 4A to 4D are diagrams illustrating some exemplary keypads adapted to the sub-input units according to the present invention.

In FIG. 4A, the sub-input unit can convert into each of a numeral mode, a character mode, etc. using E-ink and make touch input possible.

In FIG. 4B, the sub-input unit can receive and display information on the portable terminal such as a battery level, a memory level, a peripheral light brightness, etc.

In FIG. 4C, if the portable terminal changes into a sleep mode during a specific operation, the sub-input unit can maintain the portable terminal in the sleep mode while inputting a signal controlling the specific operation. For example, as illustrated in FIG. 4C, a user can control 'play', 'stop', 'select', etc. of a corresponding sound source without converting the portable terminal from the sleep mode to an active mode during an operation of MP3 playing. Also, the sub-input unit can reverse and display a corresponding key in order to identify that the corresponding key is selected.

In FIG. 4D, the sub-input unit can be constructed such that a key directly enables a specific mode such as a camera mode, a navigation mode, a Bluetooth mode, a DMB mode, etc.

Consequently, a cover for a portable terminal according to the present invention can provide a diversity of data output methods and/or input methods and maximize the usability of a user. Further, by using a cover for a portable terminal according to the present invention, the portable terminal can be supplied with reserve power required for operation.

While the invention has been shown and described with reference to certain preferred exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims, and all differences within the scope will be construed as being included in the present invention.

What is claimed is:

1. A cover for a portable terminal comprising:
a folder;
a fixing part for fixing the portable terminal to the folder, the folder rotating at the fixing part to open and close the portable terminal;
wherein the folder comprises:
a sub-input unit for inputting data to the portable terminal and/or a sub-display unit for displaying data output from the portable terminal, in which the sub-input unit and/or sub-display unit being constructed in the folder for being electrically coupled to the portable terminal in which the sub-input unit and/or sub-display unit of the folder provide an auxiliary input unit and/or auxiliary display for the portable terminal for the portable terminal, and
wherein when the portable terminal changes into a sleep mode during a specific operation, the portable terminal remains in sleep mode and when the sub-display unit provides an auxiliary display unit, the folder displays corresponding controls for controlling the specific operation, with the folder being in either an open or closed position; and
a charging unit arranged in at least one of the fixing part and folder, and supplying power to the portable terminal.

2. The cover of claim 1, wherein the charging unit comprises at least one solar cell and the charging unit supplies power generated in the solar cell to the portable terminal, and wherein the fixing part provides a releasable attachment for the portable terminal.

3. The cover of claim 1, wherein the sub-input unit comprises at least one of a dome switch input scheme, a pressure sensor input scheme, and a touch input scheme.

4. The cover of claim 1, wherein the sub-display unit of the folder comprises a flexible display.

5. The cover of claim 4, wherein the flexible display uses Electronic ink (E-ink).

6. The cover of claim 5, wherein the sub-input unit comprises a touch input scheme using the E-ink.

7. The cover of claim 1, wherein the charging unit is stacked and constructed on an upper part or lower part of the sub-input unit or the sub-display unit.

8. The cover of claim 1, wherein the sub-input unit and/or sub-display unit of the folder is operable depending on an unfolded and folded position of the folder.

9. The cover of claim 1, wherein the charging unit charges a battery of the portable terminal.

10. The cover of claim 1, wherein the portable terminal automatically senses an electrical coupling with the cover, and operates in association with the sub-input unit, the sub-display unit, and the charging unit.

11. The cover of claim 1, the sub-input unit and/or the sub-display unit receives power from the portable terminal.

12. The cover of claim 1, wherein, if the portable terminal operates in a sleep mode during a corresponding operation, the sub-input unit inputs a signal controlling the corresponding operation without disrupting the sleep mode of the portable terminal.

13. A detachable cover for a portable terminal, the detachable cover includes a sub-input unit providing an auxiliary input for inputting data to the portable terminal and a sub-display unit comprising an auxiliary display unit of the portable terminal for displaying data output from the portable terminal, and a charging unit including a solar cell for supplying power generated to the portable terminal wherein the portable terminal changes into a sleep mode during a specific predetermined operation, the portable terminal remains in sleep mode when the sub-input unit inputs a signal associated with the specific predetermined operation and the sub-display unit displays selectable controls for controlling the specific predetermined operation, with the folder being in either an open or closed position.

14. The cover of claim 13, wherein the sub-input unit of the detachable cover comprises at least one of a dome switch input scheme, a pressure sensor input scheme, and a touch input scheme.

15. The cover of claim 13, wherein the sub-display unit of the detachable cover comprises a flexible display using Electronic ink (E-ink).

16. The cover of claim 13, wherein the sub-input unit of the detachable cover uses a touch input scheme using the sub-display unit.

17. The cover of claim 13, wherein the charging unit is stacked and constructed on an upper part or lower part of the sub-input unit or the sub-display unit of the detachable cover.

18. The cover of claim 13, wherein the charging unit charges a battery of the portable terminal.

19. The cover of claim 13, wherein the portable terminal automatically senses that the detachable cover is coupled thereto, and operates in association with the sub-input unit, the sub-display unit, and the charging unit.

20. The cover of claim 13, the sub-input unit or/and the sub-display unit of the detachable cover receives power from the portable terminal for operation.

21. The cover of claim 13, wherein, if the portable terminal changes into sleep mode during the specific predetermined operation, the sub-input unit inputs a signal controlling the specific predetermined operation selected from a display by the sub-display unit without waking up the portable terminal.

* * * * *

UNITED STATES PATENT AND TRADEMARK OFFICE
CERTIFICATE OF CORRECTION

PATENT NO.       : 8,760,405 B2
APPLICATION NO.  : 12/623511
DATED            : June 24, 2014
INVENTOR(S)      : Myoung-Ji Nam It is certified that error appears in the above-identified patent and that said Letters Patent is hereby corrected as shown below:

In the Claims

Column 5, Claim 1, Line 65 should read as follows:
--...the portable terminal, and...--

Signed and Sealed this
Thirtieth Day of September, 2014

Michelle K. Lee
*Deputy Director of the United States Patent and Trademark Office*